(12) United States Patent
Murakami

(10) Patent No.: US 8,905,409 B2
(45) Date of Patent: Dec. 9, 2014

(54) STROKE DETECTION DEVICE FOR FRONT FORK IN MOTORCYCLE AND MOTORCYCLE EQUIPPED WITH STROKE DETECTION DEVICE

(71) Applicant: Showa Corporation, Gyoda-shi (JP)

(72) Inventor: Yosuke Murakami, Fukuroi (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 14/063,397

(22) Filed: Oct. 25, 2013

(65) Prior Publication Data

US 2014/0319789 A1    Oct. 30, 2014

(51) Int. Cl.
    *B60G 17/015*    (2006.01)

(52) U.S. Cl.
    CPC ................................ *B60G 17/0152* (2013.01)
    USPC ................... 280/5.514; 280/6.157; 280/276; 280/279

(58) Field of Classification Search
    CPC ........ B60K 21/02; B60K 21/06; B60K 21/18; B62M 25/08; F16H 2063/3089; B60G 17/015
    USPC ................... 280/5.514, 6.157, 276, 279, 293
    See application file for complete search history.

(56) References Cited

U.S. PATENT DOCUMENTS

| | | | |
|---|---|---|---|
| 4,673,067 A * | 6/1987 | Munning et al. | 188/266.4 |
| 5,101,923 A * | 4/1992 | Odagi et al. | 180/219 |
| 5,211,420 A * | 5/1993 | Iwashita | 280/5.503 |
| 8,672,334 B1 * | 3/2014 | Murakami et al. | 280/5.514 |
| 2010/0294605 A1 * | 11/2010 | Mochizuki | 188/297 |
| 2011/0083930 A1 * | 4/2011 | Laird et al. | 188/275 |
| 2012/0068436 A1 * | 3/2012 | Powell et al. | 280/283 |
| 2013/0030649 A1 * | 1/2013 | Matsuda | 701/38 |
| 2013/0320647 A1 * | 12/2013 | Awasa | 280/276 |
| 2014/0069755 A1 * | 3/2014 | Laird et al. | 188/322.15 |

FOREIGN PATENT DOCUMENTS

| | | |
|---|---|---|
| DE | 102006006286 A | 8/2006 |
| JP | 02-41894 U | 3/1990 |
| JP | 2009-257498 A | 11/2009 |
| JP | 2010-012835 A | 1/2010 |
| JP | 2010-173408 A | 8/2010 |

OTHER PUBLICATIONS

Extended European Search Report mailed Jul. 3, 2014 for the corresponding European Application No. 13190434.4.

* cited by examiner

*Primary Examiner* — Ruth Ilan
*Assistant Examiner* — Darlene P Condra
(74) *Attorney, Agent, or Firm* — Leason Ellis LLP

(57) ABSTRACT

A stroke detection device includes a stem shaft which is formed of a conductor in a shape of a cylinder, in which a center line of the cylinder is located in parallel to center lines of inner tubes and outer tubes of front forks coupled to a bracket, and which serves as a steering center axis of handlebars of a motorcycle, and a coil which is formed of a conductor and provided so as to be movable in a direction along the center line of the cylinder of the stem shaft with movement in a direction along the center line of the inner tubes and the outer tubes of the front forks, in which a variation in inductance of the coil based on change in length in which the coil and the cylinder of the stem shaft overlap each other is output.

20 Claims, 7 Drawing Sheets

STROKE DETECTION DEVICE FOR FRONT FORK IN MOTORCYCLE AND MOTORCYCLE EQUIPPED WITH STROKE DETECTION DEVICE

CROSS-REFERENCE TO RELATED APPLICATIONS

This application is based on and claims priority under 35 U.S.C. 119 from Japanese Patent Application No. 2013-092815 filed on Apr. 25, 2013, the entire content of which is incorporated herein by reference.

BACKGROUND

1. Technical Field

The present invention relates to a stroke detection device for detecting a variation in length of a front fork with respect to a reference length of a front fork in a motorcycle, or the like.

2. Related Art

In a motorcycle including a pair of front forks, in which one end of an inner tube is inserted into an outer tube through an opening at the other end of the outer tube such that a center line of a tubular portion of the inner tube and a center line of a tubular portion of the outer tube are coincident with each other, each of the inner tube and the outer tube is movable in a direction along the center line of each tubular portion, one end of the outer tube is coupled to an axle of a front wheel of the motorcycle, and the other end of the inner tube is coupled to a bracket, a stroke detection device for a front fork which detects a variation (stroke) in length with respect to a reference length of the front fork during traveling of the motorcycle is known.

As the stroke detection device, a stroke detection device including a coil fixed inside a cylinder of a stem shaft as a steering center axis of handlebars of a motorcycle, and a conductor bar fixed to a top surface of a front fender and provided so as to extend upward is known (for example, see Patent Literature 1 (JP-A-2009-257498) and the like). In the stroke detection device, a variation in inductance of the coil based on change in length in which the conductor bar entering the cylinder of the stem shaft through a lower end opening of the cylinder of the stem shaft and the coil fixed inside the cylinder of the stem shaft overlap each other is output as a value for obtaining the variation in length with respect to the reference length of the front fork.

SUMMARY OF INVENTION

According to the stroke detection device disclosed in Patent Literature 1, since the coil is fixed inside the cylinder of the stem shaft, in order to prevent the coil from being pulled out from the cylinder of the stem shaft, it is necessary to perform processing for providing a retaining portion, such as a step portion, or a mounting portion, to which the retaining member is mounted, in an inner circumferential surface of the cylinder of the stem shaft.

An object of the invention is to provide a low-cost stroke detection device capable of removing processing inside a cylinder of a stem shaft.

[1] According to an aspect of the invention, a stroke detection device for a pair of front forks of a motorcycle which detects a variation in length with respect to a reference length of front forks, in which each of the front forks includes a tubular inner tube and a tubular outer tube, one end of the inner tube is inserted into the outer tube through an opening at the other end of the outer tube such that each of the inner tube and the outer tube is movable in a direction along a center line thereof, and one end of the outer tube is coupled to an axle of a front wheel of the motorcycle and the other end of the inner tube is coupled to a bracket, or one end of the outer tube is coupled to the bracket, and the other end of the inner tube is coupled to the axle of the front wheel of the motorcycle, the stroke detection device includes: a stem shaft which is formed of a conductor in a shape of a cylinder coupled to the bracket, in which a center line of the cylinder is located to be coincident with a steering center line of handlebars of the motorcycle, and the center line of the cylinder is located in parallel to the center lines of the inner tubes and the outer tubes of the front forks coupled to the bracket, and which is mounted in a vehicle frame of the motorcycle so as to be rotatable about the steering center line of the handlebars as a rotation center and serves as a steering center axis of the handlebars; and a coil which is formed of a conductor and whose center line is located to be coincident with the center line of the cylinder of the stem shaft or in parallel to the center line of the cylinder of the stem shaft so as to be movable in a direction along the center line of the cylinder of the stem shaft with movement in a direction along the center line of the inner tube and the outer tube, in which a variation in inductance of the coil based on change in length in which the coil entering the cylinder of the stem shaft through a lower end opening of the cylinder of the stem shaft and the cylinder of the stem shaft overlap each other is output as a value for obtaining the variation in length with respect to the reference length of the front forks.

[2] The stroke detection device according to claim 1, may further include: a shield member, in which the coil is provided inside the shield member, and the shield member includes a conductor which is provided in a shape of a tube so as to surround an outside of an outer circumferential surface of a spiral of the coil, a gap in which a part of a tubular wall of the tube of the conductor is removed from one end to the other end of the tube, and an insulator which fills the gap.

[3] The stroke detection device according to [2], may have a configuration in which the conductor of the shield member has a cross-sectional streamline shape in which a front end portion corresponding to a front side of the motorcycle is rounded and a rear end portion corresponding to a rear side of the motorcycle is pointed.

[4] The stroke detection device according to [1], may have a configuration in which one end of the coil is placed on a base which is located above the front wheel and is mounted between the front forks so as to face the lower end opening of the cylinder of the stem shaft, the other end of the coil is inserted into the cylinder of the stem shaft, and an elastic member which presses the other end of the coil to bias the coil toward the base is provided inside the cylinder of the stem shaft.

[5] The stroke detection device according to [2] or [3], may have a configuration in which one end of the coil and one end of the shield member are placed on a base which is located above the front wheel and is mounted between the front forks so as to face the lower end opening of the cylinder of the stem shaft, the other end of the coil and the other end of the shield member are inserted into the cylinder of the stem shaft, and an elastic member which presses the other end of the coil or the other end of the shield member to bias the coil toward the base is provided inside the cylinder of the stem shaft.

[6] The stroke detection device according to [1], may have a configuration in which one end of the coil is placed on a base which is located above the front wheel and is mounted between the front forks so as to face the lower end opening of the cylinder of the stem shaft, and the other end of the coil is inserted into the cylinder of the stem shaft so as to be movable up and down therein.

[7] The stroke detection device according to [2] or [3], may have a configuration in which one end of the coil and one end of the shield member are placed on a base which is located above the front wheel and is mounted between the front forks so as to face the lower end opening of the cylinder of the stem shaft, and the other end of the coil and the other end of the shield member are inserted into the cylinder of the stem shaft so as to be movable up and down therein.

[8] The stroke detection device according to [1], may have a configuration in which one end of the coil is fixed on a base which is located above the front wheel and is mounted between the front forks so as to face the lower end opening of the cylinder of the stem shaft.

[9] The stroke detection device according to [2] or [3], may have a configuration in which one end of the coil and one end of the shield member are fixed on a base which is located above the front wheel and is mounted between the front forks so as to face the lower end opening of the cylinder of the stem shaft.

[10] The stroke detection device according to [2] or [3], may have a configuration in which one end of the shield member is fixed on a base which is located above the front wheel and is mounted between the front forks so as to face the lower end opening of the cylinder of the stem shaft, and the coil is fixed to an inner surface of the tube of the conductor of the shield member.

[11] The stroke detection device according to [1], may have a configuration in which a coil bobbin is fixed on a base which is located above the front wheel and is mounted between the front forks so as to face the lower end opening of the cylinder of the stem shaft, and the coil is wound around an outer circumference of the coil bobbin.

[12] The stroke detection device according to [1], may have a configuration in which the coil is formed of a conducting wire having a cross-sectional streamline shape in which an outer circumferential portion of a spiral of the coil is rounded and an inner circumferential portion of the spiral of the coil is pointed.

[13] The stroke detection device according to [11], may have a configuration in which the coil is formed of a conducting wire having a cross-sectional streamline shape in which an outer circumferential portion of a spiral of the coil is rounded and an inner circumferential portion of the spiral of the coil is pointed.

[14] According to an aspect of the invention, a motorcycle includes: the stroke detection device for a pair of front forks in a motorcycle according to any one of [1] to [13]; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

With the configuration of [1], since it is not necessary to perform processing for providing the coil in the inner surface of the cylinder of the stem shaft, and it should suffice that the cylindrical stem shaft having a given inner diameter is formed using a conductive material, such as a metal, it is possible to reduce processing cost of the stem shaft and to provide a low-cost stroke detection device.

With the configuration of [2], since the shield member includes the insulator, it is possible to provide a stroke detection device which can prevent the occurrence of an eddy current which will flow around the outer circumference of the coil through the conductor surrounding the coil to obtain an effective gain, and can prevent disturbance from the outside with the shield member.

With the configuration of [3], since the conductor of the shield member is formed in a cross-sectional streamline shape, it is possible to reduce air resistance during traveling of the motorcycle.

With the configuration of [4] or [5], since it should suffice that one end of the coil or the shield member is not fixed to the base, it is possible to provide a stroke detection device which allows easy addition to the motorcycle, can suppress excessive vertical movement of the coil or the shield member with the elastic member, and has excellent detection precision.

With the configuration of [6] or [7], since it should suffice that one end of the coil or the shield member is not fixed to the base, it is possible to provide a stroke detection device which allows easy addition to the motorcycle.

With the configuration of [8] or [9], since one end of the coil according to the first aspect is fixed to the base, a conductor, which is relatively moved with respect to the coil, other than the stem shaft and the coil is not required, thereby reducing parts cost and providing a low-cost stroke detection device. It is also possible to provide a stroke detection device which achieves stabilization of the coil, improves detection precision of the variation (stroke) in length with respect to the reference length of the front fork, and has high reliability. Since one end of the coil and one end of the shield member according to the second or third aspect are fixed to the base, it is possible to provide a stroke detection device which achieves stabilization of the coil and the shield member, improves detection precision of the variation in length with respect to the reference length of the front fork and shield precision, and has high reliability.

With the configuration of [10], since one end of the shield member according to the second or third aspect is fixed to the base, and the coil is fixed to the inner surface of the tube of the conductor forming the shield member, the shield member functions as a coil mounting member, thereby increasing rigidity of the coil and preventing deflection of the coil. For this reason, it is possible to provide a stroke detection device which has improved detection precision of the variation in length with respect to the reference length of the front fork and high reliability.

With the configuration of [11], since the coil according to the first aspect is fixed in a state of being wound around the outer circumference of the coil bobbin fixed to the base, it is possible to increase rigidity of the coil owing to the coil bobbin and to prevent deflection of the coil. For this reason, it is possible to provide a stroke detection device which has improved detection precision of the variation in length with respect to the reference length of the front fork and high reliability.

With the configuration of [12] or [13], since the coil according to the first or eighth aspect is formed of the conducting wire having a cross-sectional streamline shape in which the outer circumferential portion of the spiral of the coil is rounded and the inner circumferential portion of the spiral of the coil is pointed, it is possible to reduce air resistance during traveling of the motorcycle.

With the configuration of [14], it is possible to provide a motorcycle in which the front fork is controlled so as to change the length of the front fork on the basis of the value output from the stroke detection device.

DESCRIPTION OF EMBODIMENTS

Hereinafter, although the invention will be described referring to embodiments of the invention, the following embodiments are not intended to limit the inventions described in the appended claims. It should be noted that all combinations of the features described in the embodiments are not essential for a resolution of the invention, and a configuration in which the features may be selectively used may be made.

Embodiment 1

Figure 1:
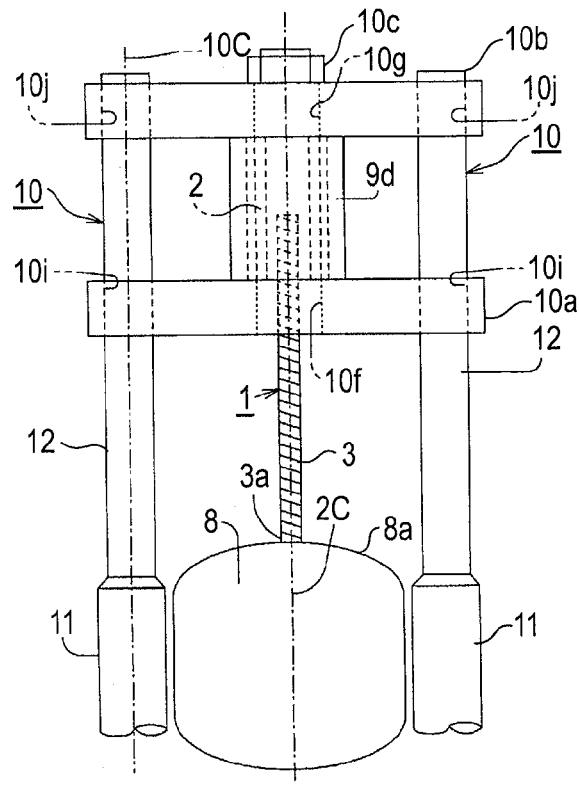
FIG. 1 is a diagram showing a stroke detection device when viewed from a front side of a motorcycle.
Figure 2:
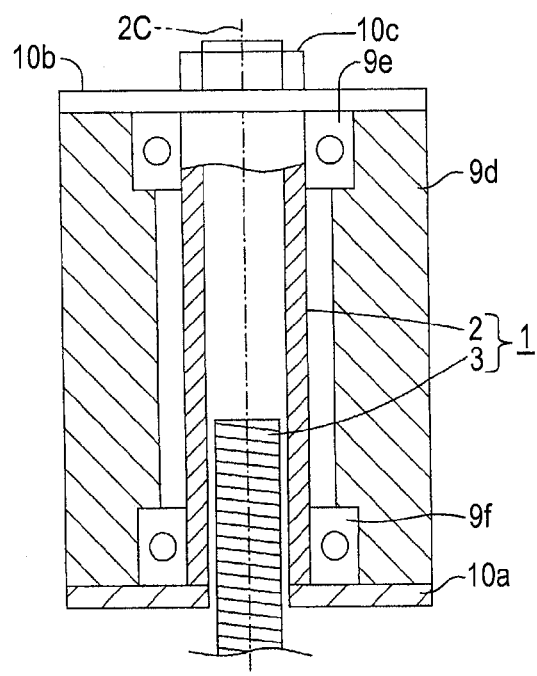
FIG. 2 is a sectional view showing a stroke detection device.
Figure 3:
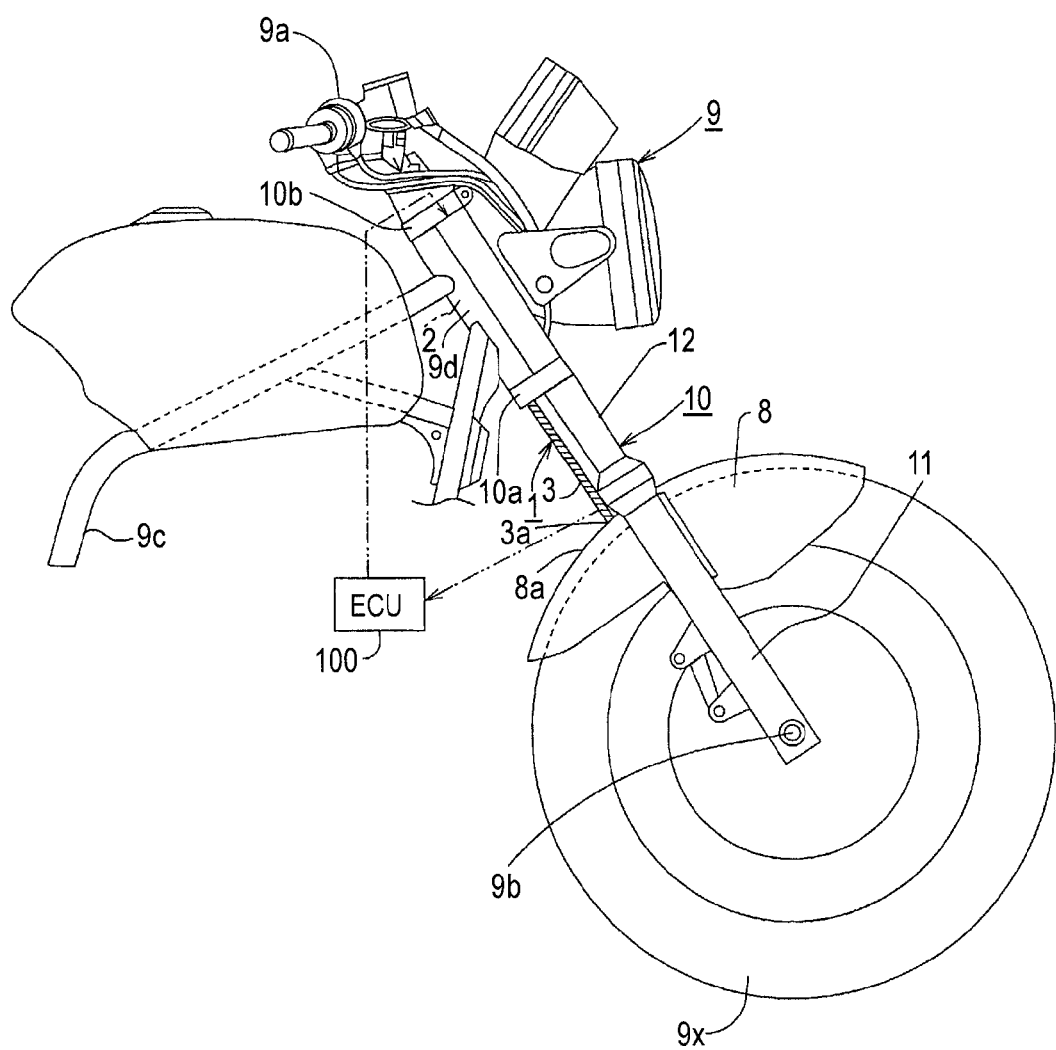
FIG. 3 is a side view showing a motorcycle in which a stroke detection device and a vehicle height adjustment device are mounted.

As shown in FIGS. 1, 2, and 3, a stroke detection device 1 of a front fork 10 includes a stem shaft 2 which is formed of a conductor, such as a metal, in a cylindrical shape and serves as a steering center axis (rotation center axis) of handlebars 9a of a motorcycle 9, and a coil 3 which is formed of a conductor, such as a metal, and is provided so as to be movable in a direction along a center line 2C of a cylinder of the stem shaft 2 inside the cylinder of the stem shaft 2.

The front fork 10 has a configuration in which one end of an inner tube 12 is inserted into an outer tube 11 through an opening at the other end of the outer tube 11 such that a center line 10C of a tubular portion of the inner tube 12 and a center line 10C of a tubular portion of the outer tube 11 are coincident with each other, and each of the inner tube 12 and the outer tube 11 is movable in a direction along the center line 10C of each tubular portion.

The front fork 10 has an oil flow path and flow path resistance provided in the oil flow path therein, and includes a suspension spring. For example, one end of the outer tube 11 is coupled to an axle 9b of the motorcycle, and the other end of the inner tube 12 is coupled to a vehicle frame 9c of the motorcycle 9, such that the suspension spring absorbs an impact force applied from a road to a vehicle during traveling of the motorcycle 9, and a damping force which damps the motions of the inner tube 12 and the outer tube 11 is generated by pressure loss due to the flow path resistance when oil stored in the front fork 10 flows through the oil flow path. Thus, a function as a hydraulic shock absorber which damps stretching vibration of the front fork 10 caused by absorption of the impact force by the suspension spring is achieved.

The stem shaft 2 is rotatably mounted in a head pipe 9d which functions as a cylindrical stem shaft rotation support member as a part of the vehicle frame 9c provided in a front upper portion of the vehicle frame 9c of the motorcycle 9.

That is, as shown in FIG. 2, the stem shaft 2 is inserted into the cylinder of the head pipe 9d such that the center line 2C of the cylinder of the stem shaft 2 is coincident with a center line of the cylinder of the head pipe 9d which serves as a steering center line of the handlebars 9a. A bearing 9e is provided between an upper-end inner circumferential surface of the cylinder of the head pipe 9d and an upper-end outer circumferential surface of the stem shaft 2. A bearing 9f is provided between a lower-end inner circumference of the cylinder of the head pipe 9d and a lower-end outer circumferential surface of the stem shaft 2. With this configuration, the stem shaft 2 is mounted in the head pipe 9d so as to be accurately and smoothly rotatable around the center line of the cylinder of the head pipe 9d.

As shown in FIG. 1, the lower end of the cylinder of the stem shaft 2 is mounted to be fitted into a stem shaft fixing hole 10f of an under bracket 10a and protrudes upward from an upper end opening of the cylinder of the head pipe 9d, and a stem nut 10c is fastened to a thread portion (not shown) which is formed in an upper end portion of the cylinder of the stem shaft 2 passing through a stem shaft through hole 10g (not shown) of an upper bracket 10b. With this, the under bracket 10a, the upper bracket 10b, and the stem shaft 2 are mounted in the head pipe 9d so as to be rotatable about the center line of the cylinder of the head pipe 9d as a rotation center.

The under bracket 10a includes a stem shaft fixing hole 10f in a central portion of a plate material, and front fork fixing holes 10i and 10i on both the left and right sides of the plate material around the stem shaft fixing hole 10f.

The upper bracket 10b includes a stem shaft through hole 10g in a central portion of a plate material, and front fork fixing holes 10j and 10j on both the left and right sides of the plate material around the stem shaft through hole 10g.

For example, the handlebars 9a is mounted by fixing to a handlebars fixing portion (not shown) provided in the upper bracket 10b or the front fork 10.

For example, a pair of left and right front forks 10 and 10 have a configuration in which the inner tubes 12 are inserted into the front fork fixing holes 10i and 10j such that the centers of the tubular portions of the inner tubes 12 are coincident with the centers of the front fork fixing holes 10i and 10j, the other ends of the inner tubes 12 and 12 of a pair of left and right front forks 10 and 10 are fixed to the front fork fixing holes 10j and 10j provided on the left and right sides of the upper bracket 10b, and middle portions of the inner tubes 12 and 12 of a pair of left and right front forks 10 and 10 are fixed to the front fork fixing holes 10i and 10i provided on the left and right sides of the under bracket 10a.

One ends of the outer tubes 11 and 11 of a pair of left and right front forks 10 and 10 are coupled to the axle 9b which protrudes on the left and right sides of a front wheel 9x from a center of the front wheel 9x of the motorcycle 9.

A fender (mudguard member) 8 as a bridge member which functions as a base located above the upper portion of the front wheel 9x of the motorcycle 9 and coupled to the outer tubes 11 and 11 of a pair of left and right front forks 10 and 10 is provided.

For example, the coil 3 is formed by winding a conducting wire formed of copper in a spiral shape, and a center line of the spiral of the coil 3 is located to be coincident with the center line 2C of the stem shaft 2 or in parallel to the center line 2C of the stem shaft 2 such that the coil 3 is movable in a direction along the center line of the cylinder of the stem shaft 2 with movement (that is, extension and compression of the front forks 10 and 10 mounted on the front wheel 9x side of the motorcycle 9) in a direction along the center line 10C of the tubular portion of each of the inner tube 12 and the outer tube 11. Thus, a lower end 3a (one end) of the coil 3 is fixed to a top surface 8a of the fender 8 by fixing means (not shown).

As the fixing means (not shown), for example, if fixing means using a fitting hole formed in the top surface 8a of the fender 8 so as to fix the lower end portion (one end portion) of the coil 3 in a fitted state, fixing means, such as welding, for fixing a lower end portion of the coil 3 to a metal plate fixed to the top surface 8a of the fender 8, or the like is used, it is possible to provide the stroke detection device 1 which achieves stabilization of the coil 3, improves detection precision of a variation (stroke) in length with respect to a reference length of the front fork 10, and has high reliability.

A longitudinal dimension of the coil 3 is set such that an upper end portion of the coil 3 and a lower end portion of the cylinder of the stem shaft 2 overlap each other during maximum extension of a pair of left and right front forks 10 and 10 mounted on the front wheel 9x of the motorcycle 9, and the upper end portion of the coil 3 is located below an upper end opening of the cylinder of the stem shaft 2 during maximum compression of the front forks 10 and 10.

According to the stroke detection device 1 configured as above, during traveling of the motorcycle 9, when the front forks 10 are extended and compressed, the stem shaft 2 moves in an up-down direction along with the inner tubes 12 and 12 of the front forks 10 and 10, and the coil 3 moves in an up-down direction along with the fender 8 mounted between the outer tubes 11 and 11. Then, the variation (stroke) in length of the front fork 10 with respect to the reference length of the front fork 10 appears as a variation in length of a portion in which the lower end portion of the cylinder of the stem shaft 2 and the upper end portion of the coil 3 overlap each other, and the variation in length can be detected as a variation in inductance of the coil 3. That is, the coil 3 functions as a sensor for detecting change in inductance with change in length in which the coil 3 and the stem shaft 2 overlap each other.

That is, the stroke detection device 1 is the stroke detection device 1 which can output the variation in inductance of the coil 3 based on change in length of the portion, in which the upper end portion of the coil 3 entering the cylinder of the stem shaft 2 through the lower end opening of the cylinder of the stem shaft 2 and the lower end portion of the cylinder of the stem shaft 2 overlap each other, as a value for obtaining the variation (stroke) in length with respect to the reference length of the front fork 10.

Accordingly, the variation in inductance of the coil is output to a control device (hereinafter, referred to as an electronic control unit (ECU)) 100 mounted in the motorcycle 9 described below, such that the ECU 100 can detect the variation in length of the front forks 10 and 10 with respect to the reference length of the front forks 10 and 10 during traveling of the motorcycle 9. For example, the average value or the like of the amount of extension and compression of the front forks 10 and 10 within a predetermined time during traveling of the motorcycle can be detected, and the inner tube 12 of the front fork 10 is moved upward or downward according to a road situation, making it possible to change the vehicle height of the motorcycle during traveling of the motorcycle.

According to the stroke detection device 1 of Embodiment 1, unlike Patent Literature 1, since it is not necessary to perform processing for providing a retaining portion in which a coil is provided or a mounting portion to which the retaining portion is mounted, in the inner surface of the cylinder of the stem shaft, and it should suffice that the cylindrical stem shaft 2 having a uniform inner diameter is formed using a conductive material, such as a metal, it is possible to reduce processing cost of the stem shaft 2 compared to Patent Literature 1 and to provide the low-cost stroke detection device 1.

Unlike Patent Literature 1, since a conductor, which is relatively moved with respect to the coil, other than the stem shaft and the coil is not required, it is possible to reduce parts cost compared to Patent Literature 1 and to provide the low-cost stroke detection device 1.

Embodiment 2

In Embodiment 1, although the lower end 3a of the coil 3 is fixed to the top surface 8a of the fender 8 by fixing means, a round bar-shaped or cylindrical coil mounting member which becomes a coil bobbin fixed to the top surface 8a of the fender 8 by the above-described fixing means or the like may be provided, and the coil 3 may be fixed in a state of being wound around an outer circumference of the coil mounting member. In this case, it is preferable that the coil mounting member is formed of a non-magnetic resin material.

According to Embodiment 2, since it is possible to reduce processing cost of the stem shaft 2 compared to Patent Literature 1, to increase rigidity of the coil 3 with the coil bobbin, and to prevent deflection of the coil 3, it is possible to provide the stroke detection device 1 which improves detection precision of the variation (stroke) in length with respect to the reference length of the front fork 10 and has high reliability.

Embodiment 3

Figure 4:
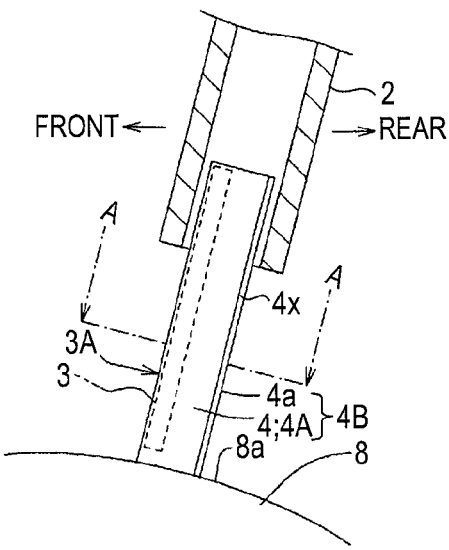
FIG. 4 is a diagram showing a stroke detection device when viewed from a lateral side of a motorcycle.
Figure 5:
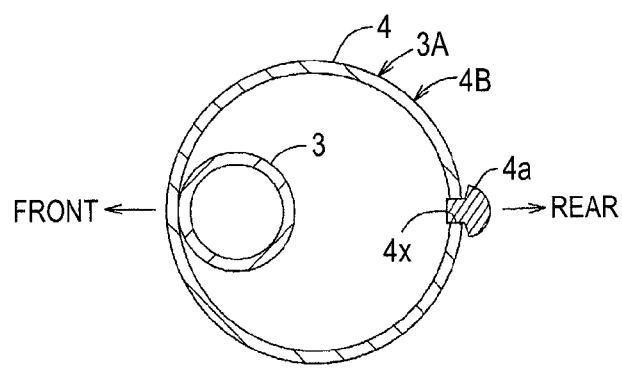
FIG. 5 is a sectional view taken along the line A-A of FIG. 4.
Figure 6:
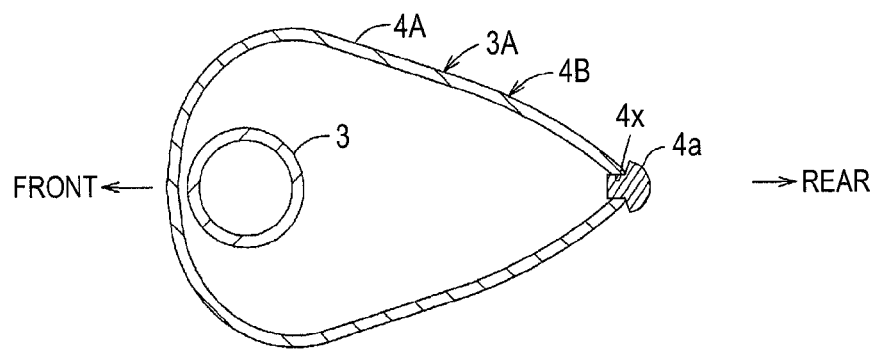
FIG. 6 is a sectional view taken along the line A-A of FIG. 4.

As shown in FIGS. 4 to 6, the coil 3 may be provided inside a shield member 4B, and as the shield member 4B, a shield member 4B including a conductor 4 or a conductor 4A which is provided in a tubular shape so as to surround the outside of an outer circumferential surface of a spiral of the coil 3, a gap 4x in which a part of the tubular wall of the tube of the conductor 4 or the conductor 4A is removed from one end to the other end of the tube, and an insulator 4a which fills the gap 4x may be used. That is, a coil structure 3A in which the coil 3 is provided inside the shield member 4B provided so as to surround the outside of the outer circumferential surface of the spiral of the coil 3 may be formed, and at least a lower end portion of the shield member 4B of the coil structure 3A may be fixed to the top surface 8a of the fender 8 by fixing means.

The coil 3 and the shield member 4B may be in contact with each other or separated from each other.

An inner surface of the tube of the conductor of the shield member 4B and an outer surface of the coil 3 may be fixed by an adhesive or the like. In this way, when the coil 3 and the shield member 4B are fixed by an adhesive or the like, if only the lower end portion of the shield member 4B is fixed to the top surface 8a of the fender 8 by fixing means, since the shield member 4B functions as a coil mounting member, it is possible to increase rigidity of the coil 3 and to prevent deflection of the coil 3. For this reason, it is possible to provide the stroke detection device 1 which improves detection precision of the variation in length with respect to the reference length of the front fork 10 and has high reliability.

If both the lower end portion of the shield member 4B of the coil structure 3A and the lower end portion of the coil 3 are fixed to the top surface 8a of the fender 8 by fixing means, it is possible to provide the stroke detection device 1 which achieves stabilization of the shield member 4B and the coil 3, improves detection precision of the variation (stroke) in length with respect to the reference length of the front fork 10 and shield precision, and has high reliability.

For example, at least the lower end portion (one end portion) of the shield member 4B is fixed to the top surface 8a of the fender 8 by fixing means (not shown) such that a center line of the shield member 4B of the coil structure 3A is coincident with the center line 2C of the stem shaft 2, a center line of the coil 3 of the coil structure 3A is in parallel to the center line 2C of the stem shaft 2, the upper portion (the other end) of the coil 3 and an upper portion (the other end) of the shield member 4B are provided so as to be movable inside the cylinder of the stem shaft 2, the conductor 4 or the conductor 4A of the shield member 4B is connected to a grounded region of the motorcycle 9 to constitute the stroke detection device 1 in which the conductor 4 or the conductor 4A is grounded. Thus, since the shield member 4B includes the insulator 4a, it is possible to provide the stroke detection device 1 which can prevent the occurrence of an eddy current which will flow around the outer circumference of the coil 3 through the conductor surrounding the coil 3 to obtain an effective gain and can prevent disturbance from the outside with the shield member 4B.

That is, in the configuration of Patent Literature 1, if a stem shaft is a conductor, an eddy current which will flow around an outer circumference of a coil in the stem shaft with the coil fixed thereto occurs, causing a decrease in inductance of the coil. For this reason, an effective gain (variation in inductance) which can be detected by the coil decreases. In contrast, in the configuration of Embodiment 3, since it is possible to prevent the occurrence of the eddy current which will flow around the conductor on the outer circumference of the coil 3, it is possible to provide the stroke detection device 1 which can obtain an effective gain and can prevent disturbance from the outside.

For example, the shield member 4B may be formed in a tubular shape in which a rectangular conductor plate is bent and both short side edges of the rectangle face each other at the gap 4x, the insulator 4a may be provided so as to close the gap 4x, and the insulator 4a and both side edges which face each other at the gap may be fixed by fixing means, such as an adhesive.

For example, as shown in FIG. 5, if the shield member 4B is formed in a cylindrical shape, and the coil 3 and the shield member 4B are fixed by an adhesive or the like, it is possible to increase rigidity of the coil 3 and to prevent deflection of the coil 3, thereby improving detection precision of the variation (stroke) in length with respect to the reference length of the front fork 10.

As shown in FIG. 6, the shield member 4B in which the conductor 4A of the shield member 4B is formed in a cross-sectional streamline shape, in which the front end portion corresponding to the front side of the motorcycle 9 is rounded and the rear end portion corresponding to the rear side of the motorcycle 9 is pointed is used, it is possible to reduce air resistance during traveling of the motorcycle 9. That is, in this case, it is possible to provide the stroke detection device 1 which can obtain an effective gain, can prevent disturbance from the outside, and can reduce air resistance.

Embodiment 4

In a state that the lower end 3a (one end) of the coil 3 or the lower end (one end) of the coil structure 3A is be placed on the top surface 8a of the fender 8 as the base, the upper end of the coil 3 or the upper end portion of the coil 3 of the coil structure 3A and the upper end portion of the shield member 4B may be inserted into the cylinder of the stem shaft 2 so as to be movable up and down therein. More specifically, the upper end of the coil 3 or the upper end portion of the coil 3 of the coil structure 3A and the upper end portion of the shield member 4B may be slidably fitted inside the cylinder of the stem shaft 2.

In Embodiment 4, since the lower end 3a of the coil 3 or the lower end of the coil structure 3A may not be fixed to the top surface 8a of the fender 8, it is possible to allow the stroke detection device 1 to be easily added to the motorcycle 9. In Embodiment 4, in order to suppress excessive vertical movement of the coil 3 or the coil structure 3A, it is preferable to use the weighty coil 3 or the coil structure 3A.

Embodiment 5

The lower end 3a of the coil 3 or the lower end of the coil structure 3A may be placed on the top surface 8a of the fender 8 as the base, the upper end of the coil 3 or the upper end portion of the coil 3 of the coil structure 3A and the upper end portion of the shield member 4B may be inserted into the cylinder of the stem shaft 2, and an elastic member which presses the upper end of the coil 3 or an upper end of the coil structure 3A inside the cylinder of the stem shaft 2 to bias the coil 3 toward the top surface 8a of the fender 8 may be provided inside the cylinder of the stem shaft 2. As the elastic member, for example, a compression spring which is fixed to the inner surface of the cylinder of the stem shaft 2, the stem nut 10c, or the like, a compression spring which has a lower end in contact with the upper end of the coil 3 or the upper end of the coil structure 3A and an upper end in contact with the stem nut 10c, or the like may be used.

In Embodiment 5, since the lower end 3a of the coil 3 or the lower end of the coil structure 3A may not be fixed to the top surface 8a of the fender 8, it is possible to provide the stroke detection device 1 which allows the stroke detection devices 1 to be easily added to the motorcycle 9, and can suppress excessive vertical movement of the coil 3 or the coil structure 3A with the elastic member, and has excellent detection precision.

Embodiment 6

In a configuration in which the coil 3 is exposed, as the coil 3, if the coil 3 which is formed using a conducting wire having a cross-sectional streamline shape in which an outer circumferential portion of the spiral of the coil 3 is rounded and an inner circumferential portion of the spiral of the coil 3 is pointed is used, it is possible to reduce air resistance during traveling of the motorcycle 9.

Embodiment 7

Hereinafter, an example of a motorcycle including the stroke detection device 1 described in any one of Embodiment 1 to Embodiment 6 and a vehicle height adjustment device which changes the vehicle height of the motorcycle by converting a value output from the stroke detection device 1 to a variation in length with respect to the reference length of the front fork and controlling the front fork so as to change the length of the front fork depending on the variation in length will be described.

As shown in FIG. 3, the motorcycle 9 includes the above-described stroke detection device 1, the front forks 10 and 10 equipped with a vehicle height adjustment mechanism on the front wheel 9x side, and the ECU 100.

The height adjustment device includes the front forks 10 and 10 equipped with a vehicle height adjustment mechanism, and the ECU 100 which controls the vehicle height adjustment mechanism on the basis of an output value from the stroke detection device 1.

The ECU 100 receives an output variation in inductance of the coil 3 from the stroke detection device 1 as input to determine the variation in length of the front forks 10 and 10 with respect to the reference length of the front forks 10 and 10 mounted on the front wheel 9x side of the motorcycle 9, and controls the vehicle height adjustment mechanism of the front forks 10 and 10 on the basis of the determination result. With this control, the inner tubes 12 and 12 of the front forks 10 and 10 are moved upward or downward, making it possible to change the vehicle height of the motorcycle 9.

Next, an example of the front fork 10 having a vehicle height adjustment mechanism will be described referring to FIGS. 7 to 10.

The front fork 10 has a configuration in which one end of the inner tube 12 is inserted into the outer tube 11 through the opening at the other end of the outer tube 11 such that the center line 10C of the tubular portion of the outer tube 11 is coincident with the center line 10C of the tubular portion of the inner tube 12, and each of the inner tube 12 and the outer tube 11 is movable in a direction along the center line 10C of each tubular portion, and a damping force generation device having an oil flow path and flow path resistance provided in the oil flow path, a suspension spring, a spring bearing, and a vehicle height adjustment mechanism are provided inside the inner tube 12 and the outer tube 11.

For example, one end of the outer tube 11 is coupled to the axle 9b of the motorcycle 9 and the other end of the inner tube 12 is fixed to a bracket (for example, the above-described under bracket 10a and upper bracket 10b) on the vehicle frame 9c of the motorcycle 9. With this, the suspension spring absorbs an impact force applied from the road to the vehicle during traveling of the motorcycle 9, and a damping force which damps the motions of the inner tube 12 and the outer tube 11 is generated by pressure loss due to the flow path resistance when oil in the front fork 10 flows through the oil flow path. Thus, a function as a hydraulic shock absorber which damps stretching vibration of the front fork 10 caused by absorption of the impact force by the suspension spring is achieved.

Figure 7:
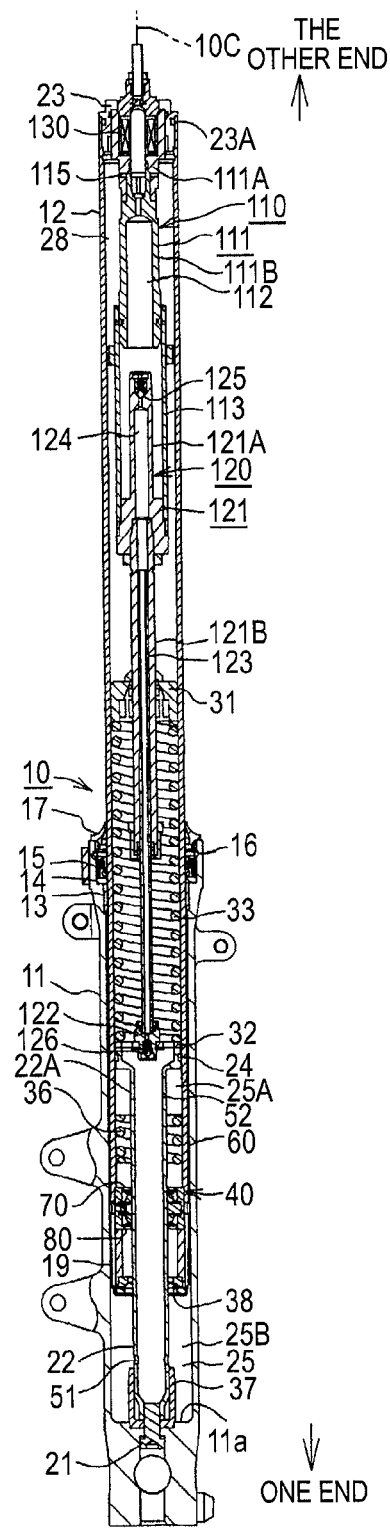
FIG. 7 is a sectional view showing an example of a front fork having a vehicle height adjustment mechanism.
Figure 8:
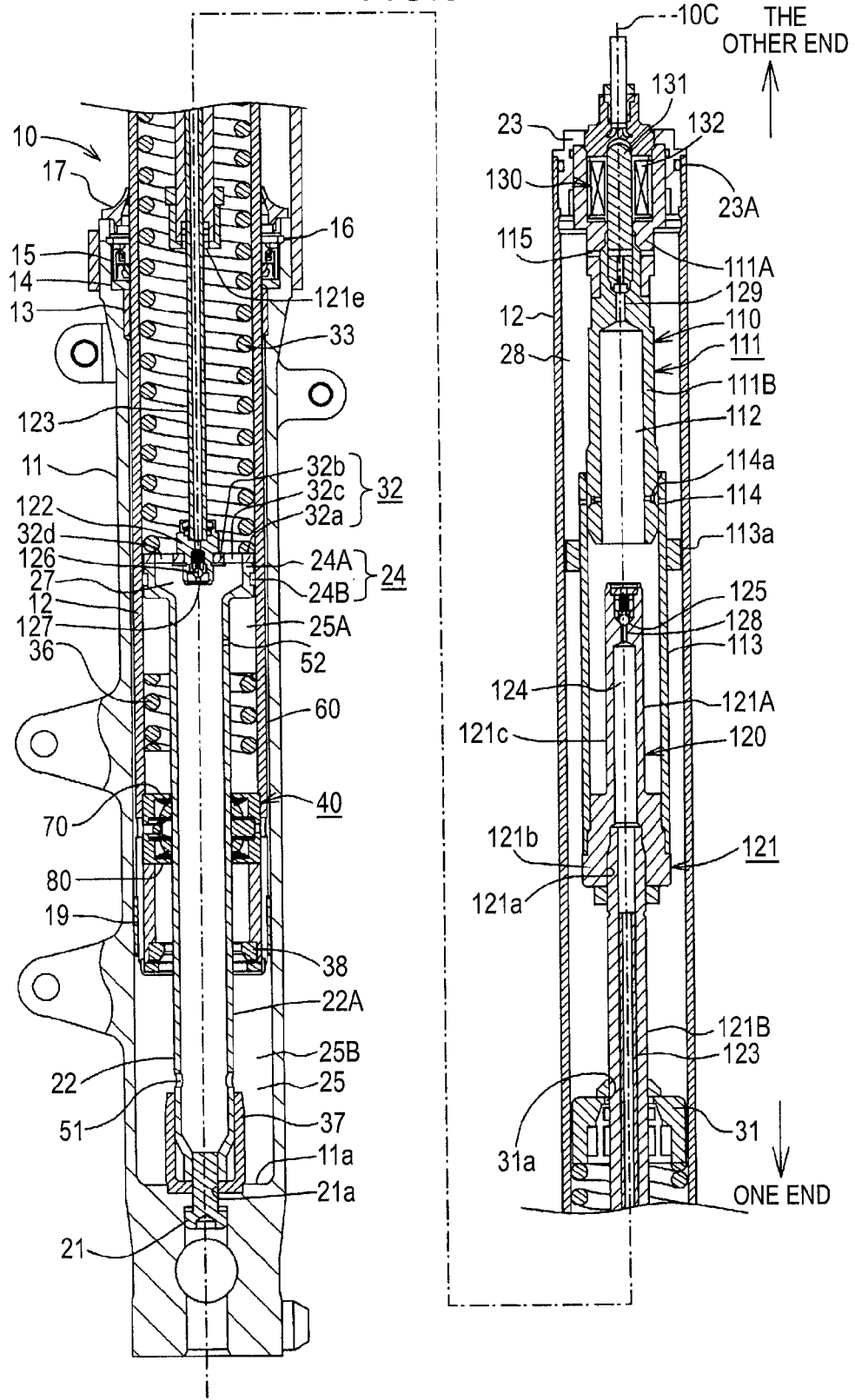
FIG. 8 is an enlarged sectional view showing an example of a front fork having a vehicle height adjustment mechanism.

Hereinafter, in order to describe an upright front fork 10 in which one end of the outer tube 11 is coupled to the axle 9b of the motorcycle 9 and the other end of the inner tube 12 is coupled to the bracket on the vehicle frame 9c of the motorcycle, such that one end in FIGS. 7 and 8 is located on the lower side and the other end in FIGS. 7 and 8 is located on the upper side, one end in FIGS. 7 and 8 is translated to the lower end and the other end in FIGS. 7 and 8 is translated to the upper end. Each component which constitutes the front fork 10 is primarily a cylindrical component, a circular component, a spiral component, or the like which is provided with the center line 10C as a center line.

In the opening at the upper end of the outer tube 11 into which a lower end of the inner tube 12 is inserted, a slide guide 13, a seal spacer 14, an oil seal 15, a stopper ring 16, a dust seal 17 are provided, such that an inner circumferential surface of the slide guide 13 and an outer circumferential surface of the inner tube 12 are slidable. A slide guide 19 is provided in an outer circumferential portion of the lower end portion of the inner tube 12, such that an outer circumferential surface of the slide guide 19 and an inner circumferential surface of the outer tube 11 are slidable.

The height adjustment mechanism includes a hydraulic pump 120, a hydraulic jack 110, and a switching valve device 130.

The hydraulic pump 120 includes a seat pipe 22, a pump pipe 123, a pump housing 121, a suspension spring 33 serving as a suspension spring, a lower spring bearing 32, and an upper spring bearing 31.

The seat pipe 22 has a configuration in which an upper end portion thereof is formed as a piston portion 24, and the lower end thereof other than the upper end portion thereof is formed as a small-diameter pipe portion 22A having a diameter to pass through a central through hole portion of a piston device 40 described below. The small-diameter pipe portion 22A has a configuration in which the lower end of the small-diameter pipe portion 22A is fixed to a lower-end inner bottom wall 11a in the outer tube 11 through the opening at the lower end of the inner tube 12.

The piston portion 24 is formed to have a diameter greater than the diameter of the small-diameter pipe portion 22A and slidable on the inner wall surface of the inner tube 12. The piston portion 24 includes a cylinder 24A which has an outer diameter corresponding to an inner diameter of the inner tube 12, and a piston ring 24B which is fitted and inserted into a circular groove formed in an outer circumferential surface of the cylinder 24A, and is configured such that an outer circumferential surface of the piston ring 24B slides on the inner circumferential surface of the inner tube 12.

A thread portion of a bolt 21 is threaded into a screw hole 21a which is formed so as to pass through the lower-end inner bottom wall 11a in the outer tube 11 and the outside of the outer tube 11, and the thread portion of the bolt 21 which passes through the screw hole 21a and is inserted into the outer tube 11 and a thread portion which is formed in an inner circumference of a lower end portion of the small-diameter pipe portion 22A of the seat pipe 22 are threaded. Then, a center line of the seat pipe 22 is coincident with the center line 10C, and the seat pipe 22 is provided so as to extend from the lower-end inner bottom wall 11a of the outer tube 11 into the inner tube 12 through the lower end opening of the inner tube 12.

For example, the lower spring bearing 32 is formed of a torus having the same diameter as the cylinder 24A of the piston portion 24 of the seat pipe 22, and is mounted in an upper-end opening edge surface of the cylinder 24A of the piston portion 24 such that the center line of the torus is coincident with the center line of the seat pipe 22.

For example, the lower spring bearing 32 includes an outer torus 32a which is fixed to the upper-end opening edge surface of the cylinder 24A, an inner torus 32b which is arranged inside the outer torus 32a with the same center line as the center line of the outer torus 32a, and coupling bodies 32c which couple the inner circumferential surface of the outer torus 32a and the outer circumferential surface of the inner torus 32b. A plurality of coupling bodies 32c are provided so as to extend in a radial shape at an interval of a predetermined angle from the center line of the inner torus 32b to the vicinity of the inner torus 32b, and a communication hole 32d is constituted by a hole surrounded by adjacent coupling bodies 32c and 32c, the inner circumferential surface of the outer torus 32a, and the outer circumferential surface of the inner torus 32b. That is, the lower spring bearing 32 has a plurality of communication holes 32d in the vicinity of the inner torus 32b, and a central fixing hole of the inner torus 32b which functions as a fixing hole for fixing the coupling body 122 with a lower end of the pump pipe 123 mounted is provided.

The lower end of the pump pipe 123 is coupled to an upper end portion of the coupling body 122 fixed to the central fixing hole of the lower spring bearing 32. The pump pipe 123 is formed of a small-diameter thin pipe.

As the suspension spring 33, a spring in which the outer diameter of a spiral of the spring is slightly smaller than the inner diameter of the inner tube 12 is used. The lower end of the spiral of the suspension spring 33 is placed on the top surface of the lower spring bearing 32 such that the spiral of the suspension spring 33 surrounds the pump pipe 123.

The pump housing 121 includes a lower pump housing 121B and an upper pump housing 121A.

The lower pump housing 121B is formed of a small-diameter thin tube which constitutes a pump pipe guide tubular portion and has openings at upper and lower ends, and an inner diameter of the tube is slightly larger than an outer diameter of the pump pipe 123.

The upper pump housing 121A includes a coupling portion 121b which has a coupling hole 121a, which is formed with a lower end opening and into which an upper end portion of the lower pump housing 121B is fitted so as not to be pulled out therefrom, and a tubular portion 121c formed with a lower end opening and extending upward from the coupling portion 121b. A space in the tubular portion 121c functions as a pump chamber 124.

The upper spring bearing 31 is a shape of a cylinder having an outer diameter slightly smaller than the inner diameter of the inner tube 12 and includes a central through hole 31a which centers on a center line of the cylinder thereof. A diameter of the central through hole 31a corresponds to an outer diameter of the lower pump housing 121B, the lower pump housing 121B passes through the central through hole 31a vertically, and the upper spring bearing 31 is substantially fixed in a middle portion between an upper end and a lower end of the lower pump housing 121B.

The upper end of the pump pipe 123 is inserted into a pump pipe guide tubular portion of the lower pump housing 121B through an opening 121e at the lower end of the lower pump housing 121B.

The pump housing 121 has a configuration in which the upper end portion of the lower pump housing 121B and the coupling hole 121a of the upper pump housing 121A are assembled vertically and fixed such that an upper end opening of the pump pipe guide tubular portion of the lower pump housing 121B communicates with the lower end opening of a tubular portion 121c of the upper pump housing 121A.

The hydraulic jack 110 includes a jack housing 111 and a plunger 113.

The jack housing 111 includes a lower jack housing 111B and an upper jack housing 111A, and has a configuration in which an upper end portion of the upper jack housing 111A is mounted in a cap bolt 23, and a lower end portion of the upper jack housing 111A and an upper end portion of the lower jack housing 111B are assembled vertically and fixed.

The lower jack housing 111B is formed of a cylindrical component having a lower end opening.

The plunger 113 is formed of a cylinder which is opened at both the upper and lower ends, an inner diameter of the cylinder corresponds to an outer diameter of the lower jack housing 111B on a lower end opening side and an outer diameter of the coupling portion 121b of the upper pump housing 121A.

A side of the lower end opening of the lower jack housing 111B is fitted into the upper end opening of the plunger 113 such that the plunger 113 and the lower jack housing 111B are movable vertically with respect to each other, and an upper end of the coupling portion 121b of the upper pump housing 121A is fitted into a lower end opening of the plunger 113 such that the lower opening of the plunger 113 and the upper end of the coupling portion 121b of the upper pump housing 121A are fixed.

A vibration stopper 113a for preventing vibration of the plunger 113 is provided on an outer circumferential surface of the plunger 113.

The cap bolt 23 is threaded into the opening at the upper end of the inner tube 12 through an O-ring 23A to close the opening at the other end of the inner tube 12.

The coupling body 122 in which the lower end of the pump pipe 123 is mounted includes a communication path 127 which communicates with an oil reservoir chamber 27 formed by a space inside the seat pipe 22 and the pump pipe 123, and a check valve 126 which is provided in the middle of the communication path 127 and permits only movement of oil from the oil reservoir chamber 27 to the pump pipe 123.

The upper end portion of the tubular portion of the upper pump housing 121A is provided with a communication path 128 which communicates with the pump chamber 124 and a jack chamber 112, and a check valve 125 which is provided in the middle of the communication path 128 and permits only movement of oil from the pump chamber 124 to the jack chamber 112.

The jack chamber 112 is defined by a space surrounded by the inside of the lower jack housing 111B, the plunger 113, and the upper pump housing 121A.

In the upper end portion of the lower jack housing 111B, a communication path 129 which communicates the inside of the lower jack housing 111B forming a part of the jack chamber 112 and an openable/closable communication path 115 provided in the upper jack housing 111A.

The switching valve device 130 includes a switching valve 131 which opens/closes the openable/closable communication path 115 formed in the upper jack housing 111A, and a driving source 132, such as a solenoid, which drives the switching valve 131 for opening and closing, and is embedded in the upper jack housing 111A.

The openable/closable communication path 115 is a path in which, when the switching valve 131 is opened, the jack chamber 112 and a space outside the upper jack housing 111A in the inner tube 12 communicates with each other, and when the switching valve 131 is closed, communication between the jack chamber 112 and the space outside the upper jack housing 111A in the inner tube 12 is blocked.

When the openable/closable communication path 115 is closed by the switching valve device 130, since the hydraulic jack 110 compresses the suspension spring 33 through the pump housing 121 and the upper spring bearing 31 by a pumping operation of the front forks 10 and 10, a distance between the upper spring bearing 31 and the lower spring bearing 32 is shortened, an initial load of the suspension spring 33 increases, and the vehicle height is raised. When the switching valve device 130 opens the openable/closable communication path 115, oil which flows into the jack chamber 112 flows out through the openable/closable communication path 115 by a pumping operation of the front forks 10 and 10 and moves to the oil reservoir chamber 27, such that the distance between the upper spring bearing 31 and the lower spring bearing 32 is extended, the suspension spring 33 is extended, the initial load of the suspension spring 33 decreases, and the vehicle height is lowered.

Figure 9:
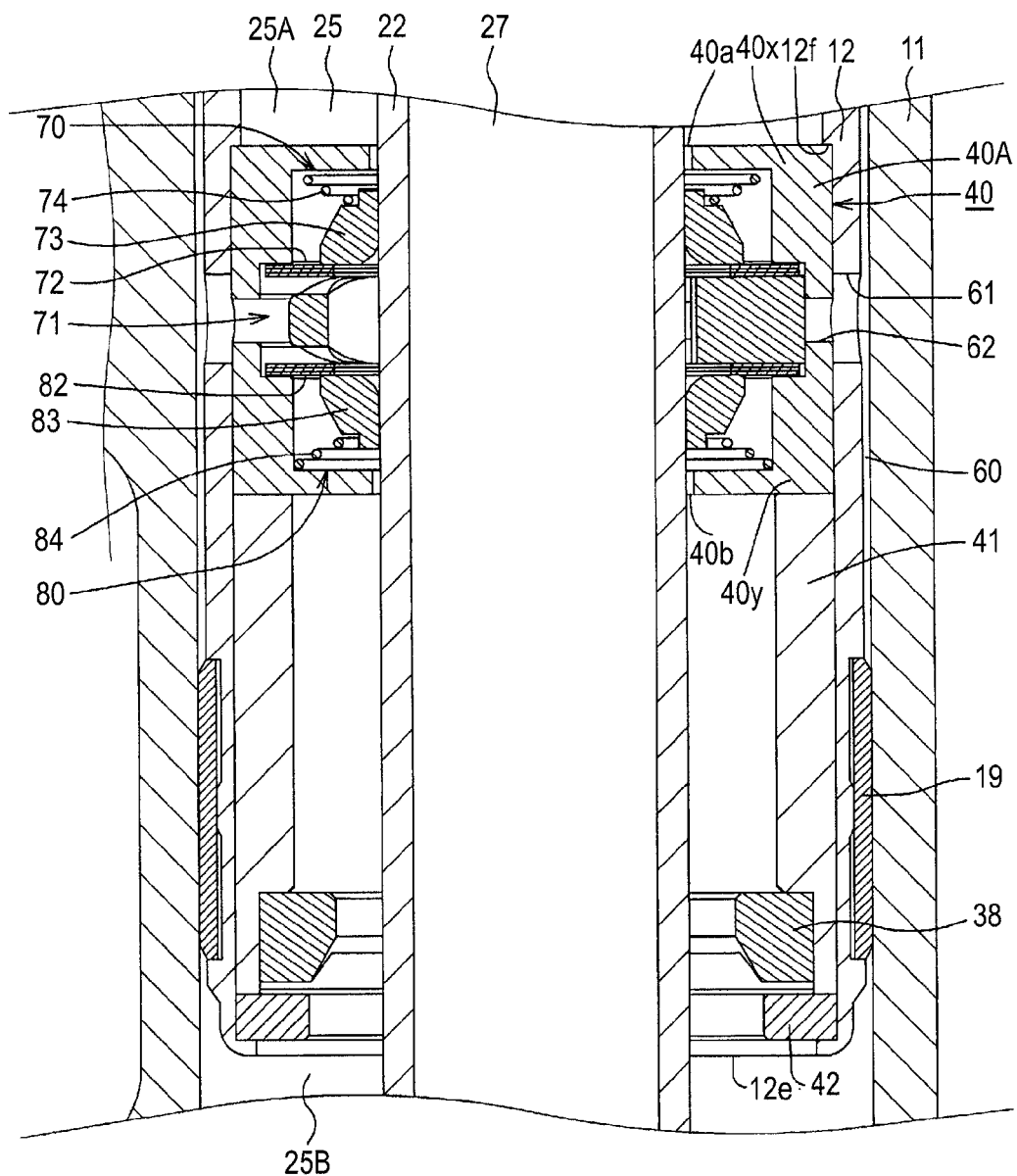
FIG. 9 is an enlarged sectional view of a damping force generation device in a front fork having a vehicle height adjustment mechanism.
Figure 10:
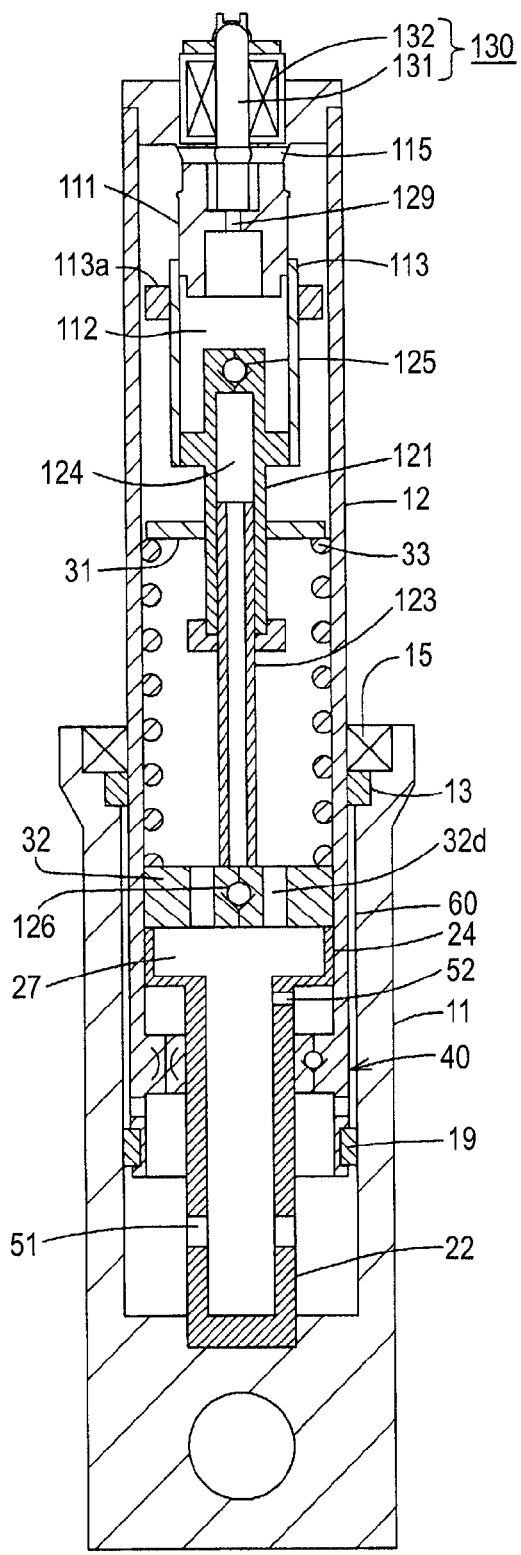
FIG. 10 is a schematic view showing an example of a front fork having a vehicle height adjustment mechanism.

As shown in FIG. 9, the piston device 40 includes an upper damping force generation device 70, a lower damping force generation device 80, and a case 40A which is formed in a hollow columnar housing, and accommodates and holds the upper damping force generation device 70 and the lower damping force generation device 80 in the housing. The case 40A includes an upper lid 40x and a lower lid 40y. The upper damping force generation device 70 and the lower damping force generation device 80 are interposed between the upper lid 40x and the lower lid 40y which are arranged such that a lower opening end surface of the upper lid 40x and an upper opening end surface of the lower lid 40y face each other vertically at an interval 62, thereby constituting the piston device 40.

The piston device 40 is mounted in a state where the case 40A is fixed to the inner circumference of the lower end portion of the inner tube 12.

The small-diameter pipe portion 22A of the seat pipe 22 passes through a central through hole portion provided in a central portion of the piston device 40, and the piston device 40 is provided so as to be movable vertically on an outer circumferential surface of the small-diameter pipe portion 22A with vertical movement of the inner tube 12.

The central through hole portion of the piston device 40 has central holes 40a and 40b formed in the top and bottom surfaces of the case 40A, and central holes of circular components described below constituting the upper damping force generation device 70 and the lower damping force generation device 80.

The piston device 40 is provided so as to be movable inside an oil chamber 25, which is defined by a space between the outer circumferential surface of the small-diameter pipe portion 22A of the seat pipe 22 and the inner circumferential surface of the inner tube 12 and a space between the outer circumferential surface of the small-diameter pipe portion 22A of the seat pipe 22 and the inner circumferential surface of the outer tube 11, along the center line of the seat pipe 22. The oil chamber 25 is partitioned into an upper oil chamber 25A which is defined between the piston device 40 and the piston portion 24 of the seat pipe 22, and a lower oil chamber 25B which is defined between the piston device 40 and the lower-end inner bottom wall 11a of the outer tube 11.

The upper damping force generation device 70 has a configuration in which an extension side damping valve 72, a compression side check value 73, and a valve spring 74 are placed in order on the upper oil chamber 25A side of a valve seat 71 fixed in the case 40A.

The upper damping force generation device 70 has a configuration in which, during an extension stroke of the front fork 10, when a flow path in an outer circumference and a flow path in an inner circumference of the extension side damping valve 72 are pushed and opened by high pressure of the upper oil chamber 25A, an extension side damping force is generated by flow path resistance of oil which flows from the upper oil chamber 25A to the lower oil chamber 25B, and during a compression stroke of the front fork 10, when the compression side check valve 73 is pushed and opened by high pressure of the lower oil chamber 25B, a compression side damping force is generated by flow path resistance of oil which flows from the lower oil chamber 25B to the upper oil chamber 25A.

The damping force generation device 80 shares the valve seat 71 of the upper damping force generation device 70, and has a configuration in which a compression side damping valve 82, an extension side check valve 83, and a valve spring 84 are placed in order on the lower oil chamber 25B side of the valve seat 71 fixed in the case 40A.

The lower damping force generation device 80 has a configuration in which, during the compression stroke of the front fork 10, when a flow path in an outer circumference and a flow path in an inner circumference of the compression side damping valve 82 are pushed and opened by high pressure of the lower oil chamber 25B, a compression side damping force is generated by flow path resistance of oil which flows from the lower oil chamber 25B to the upper oil chamber 25A, and during the extension stroke of the front fork 10, when the extension side check valve 83 is pushed and opened by high pressure of the upper oil chamber 25A, an extension side damping force is generated by flow path resistance of oil which flows from the upper oil chamber 25A to the lower oil chamber 25B.

Accordingly, in the front fork 10, the impact force which is applied from the road is absorbed by the suspension spring 33. Stretching vibration caused by absorption of the impact force of the suspension spring 33 is damped by the compression side and extension side damping force generated by the upper damping force generation device 70 and the lower damping force generation device 80.

Oil is filled in the oil reservoir chamber 27 formed by the space inside the seat pipe 22, and a space above the oil reservoir chamber 27 in the inner tube 12 is formed into an air chamber 28. A volume compensation flow path 51 for compensating for oil corresponding to a volume when the inner tube 12 moves vertically inside the oil chamber 25 which is outside the seat pipe 22 by communicating the oil chamber 25 and the oil reservoir chamber 27 with each other is formed by a through hole passing inside and outside the seat pipe 22 at the lower end of the small-diameter pipe portion 22A of the seat pipe 22.

An orifice 52 which passes inside and outside the seat pipe 22 is formed on the upper end side (the side close to the piston portion 24) of the small-diameter pipe portion 22A of the seat pipe 22, and during the extension stroke of the front fork 10, oil in the upper oil chamber 25A which is pressed by the piston device 40 and has high pressure flows into the oil reservoir chamber 27 inside the seat pipe 22 through the orifice 52.

A circular gap chamber 60 is formed by a space between the outer tube 11 and the inner tube 12 located between the slide guide 13 fixed to an inner circumference on the upper end opening side of the outer tube 11 and the slide guide 19 fixed to an outer circumference of the lower end portion of the inner tube 12.

A communication hole 61 which passes inside and outside the inner tube 12 to communicate with the circular gap chamber 60 and the interval 62 between the upper lid 40x and the lower lid 40y of the case 40A is formed in a tubular wall of the inner tube 12 at a position where the piston device 40 is fixed. Accordingly, the circular gap chamber 60 and the oil chamber 25 (the upper oil chamber 25A and the lower oil chamber 25B) outside the seat pipe 22 communicate with each other through the communication hole 61 and the interval 62. With this configuration, oil is supplied from the oil chamber 25 to the circular gap chamber 60, and lubrication of the slide guide 13 and the slide guide 19 and volume compensation between the inner circumferential surface of the outer tube 11 and the outer circumferential surface of the inner tube 12 are achieved.

A rebound spring 36 which has an absorption function during maximum extension of the front fork 10 is provided between the piston device 40 and the piston portion 24.

An oil lock piece 37 is provided in a state of being interposed between a lower end portion of the seat pipe 22 and the lower-end inner bottom wall 11a of the outer tube 11, and an oil lock collar 38 is provided in an inner circumferential surface of a lower end opening portion of the inner tube 12. In the compression stroke of the front fork 10, oil in the vicinity of the oil lock piece 37 is pressurized by the oil lock collar 38, thereby achieving an absorption function during maximum compression of the front fork 10.

As shown in FIG. 9, in a state where the piston device 40 is inserted into the inner tube 12 from a lower end opening 12e side of the inner tube 12, and an outer circumference side upper end surface of the case 40A of the piston device 40 is abutted to a positioning step surface 12f formed in the inner circumferential surface of the inner tube 12 to limit vertical movement of the case 40A, an upper end surface of a tubular spacer 41 which is inserted from the lower end opening 12e side of the inner tube 12 is abutted to an outer circumference side lower end surface of the case 40A of the piston device 40. In a state where the oil lock collar 38 is mounted in a lower end opening inner circumferential surface of the spacer 41, after a stopper ring 42 is provided in a lower end opening edge surface of the spacer 41, a lower end opening edge of the inner tube 12 is subjected to clinching, such that the piston device 40 is fixed to the inner circumferential surface on the lower end opening 12e side of the inner tube.

In the motorcycle 9, in which the front fork 10 having the above-described height adjustment mechanism is mounted on the front wheel 9x side and the ECU 100 is installed, the ECU 100 outputs a signal for opening/closing the switching valve 131 to the driving source 132 of the switching valve 131, and then the front fork 10 operates in the following manner.

When the ECU 100 outputs a switching valve closing signal to the driving source 132 of the switching valve 131 to close the switching valve 131, movement of oil from the jack chamber 112 to the oil reservoir chamber 27 through the openable/closable communication path 115 is blocked.

In a state where the switching valve 131 is closed, for example, during traveling of the motorcycle 9, when the front fork 10 moves vertically along the center line 10C of the tube and the suspension spring 33 performs an extension and compression operation, oil in the oil reservoir chamber 27 passes through the check valve 126 and the pump pipe 123 and is supplied to the pump chamber 124, and oil in the pump chamber 124 passes through the check valve 125 and is supplied to the jack chamber 112. Then, the suspension spring 33 is compressed by hydraulic pressure supplied to the jack chamber 112, the initial load of the suspension spring 33 increases, and the vehicle height is raised.

That is, in a state where the switching valve 131 is closed, for example, during traveling of the motorcycle 9, if the front fork 10 operates to be extended, while the upper spring bearing 31 and the pump housing 121 fixed to the upper spring bearing 31 are moved upward along with extension of the suspension spring 33, the pump pipe 123 is not moved. For this reason, a volume of the pump chamber 124 which is located above the pump pipe 123 increases and the pump chamber 124 has negative pressure. Accordingly, oil in the oil reservoir chamber 27 passes through the check valve 126 and the pump pipe 123 and is supplied to the pump chamber 124.

Next, if the front fork 10 operates to be compressed, the pump chamber 124 which is located above the pump pipe 123 is pressurized. Accordingly, oil in the pressurized pump chamber 124 passes through the check valve 125 and is supplied to the jack chamber 112, oil supplied to the jack chamber 112 is not discharged through the openable/closable communication path 115, and the hydraulic jack 110 compresses the suspension spring 33 through the pump housing 121 and the upper spring bearing 31. For this reason, a distance between the upper spring bearing 31 and the lower spring bearing 32 is shortened, the initial load of the suspension spring 33 increases, and the vehicle height is raised.

As described above, if the vehicle height is raised, a distance between the lower end of the inner tube 12 and the lower-end inner bottom wall 11a of the outer tube 11 increases. For this reason, it is possible to prevent collision (bottoming of the front fork 10) between the lower end of the inner tube 12 and the lower-end inner bottom wall 11a of the outer tube 11.

In a state where the switching valve 131 is closed, when an oil return path 114 formed on an upper end side of the plunger 113 reaches a connection path 114a formed on a lower end side of the lower jack housing 111B by pressure of oil supplied to the jack chamber 112, oil in the jack chamber 112 passes through the connection path 114a and the oil return path 114, and returns to the oil reservoir chamber 27 through between the vibration stopper 113a mounted on the outer circumferential surface of the plunger 113 and the inner circumferential surface of the inner tube 12, between an outer circumferential surface of the upper spring bearing 31 and the inner circumferential surface of the inner tube 12, and the communication hole 32d formed in the lower spring bearing 32. For this reason, it is possible to prevent the vehicle height from being raised higher than an upper limit set in advance and to prevent the inner tube 12 from being pulled out from the outer tube 11 (full extension of the front fork 10).

As described above, the ECU 100 can raise the vehicle height of the motorcycle 9 by vehicle height raising control to close the switching valve 131, thereby preventing bottoming and full extension of the front fork 10.

When the ECU 100 outputs a switching valve opening signal to the driving source 132 of the switching valve 131 and the switching valve 131 opens the openable/closable communication path 115, the jack chamber 112 and the outside of the jack chamber 112 communicate with each other through the openable/closable communication path 115, and movement of oil from the jack chamber 112 to the oil reservoir chamber 27 is permitted.

In a state where the openable/closable communication path 115 is opened, oil flows out from the jack chamber 112 and moves to the oil reservoir chamber 27 to extend the distance between the upper spring bearing 31 and the lower spring bearing 32, and the suspension spring 33 is extended, such that the initial load of the suspension spring 33 decreases and biasing pressure by a spring load is lowered. For this reason, the vehicle height is lowered.

In a state where the openable/closable communication path 115 is opened, during traveling of the motorcycle 9, the suspension spring 33 is extended and compressed and the front fork 10 is extended and compressed, and as described above, oil in the oil reservoir chamber 27 passes through the check valve 126 and the pump pipe 123 and is supplied to the pump chamber 124. Then, oil in the pump chamber 124 passes through the check valve 125 and is supplied to the jack chamber 112. Meanwhile, since the switching valve 131 is open, oil supplied to the jack chamber 112 passes through the openable/closable communication path 115 and returns to the oil reservoir chamber 27 through between the vibration stopper 113a mounted on the outer circumferential surface of the plunger 113 and the inner circumferential surface of the inner tube 12, between the outer circumferential surface of the upper spring bearing 31 and the inner circumferential surface of the inner tube 12, and the communication hole 32d formed in the lower spring bearing 32 (see FIG. 10). For this reason, the distance between the upper spring bearing 31 and the lower spring bearing 32 is extended, the suspension spring 33 is extended, and the initial load of the suspension spring 33 decreases, such that the vehicle height is lowered.

In a state where the switching valve 131 is opened, when the motorcycle 9 is stopped, oil in the jack chamber 112 passes through the openable/closable communication path 115 and returns to the oil reservoir chamber 27 through between the vibration stopper 113a mounted on the outer circumferential surface of the plunger 113 and the inner circumferential surface of the inner tube 12, between the outer circumferential surface of the upper spring bearing 31 and the inner circumferential surface of the inner tube 12, and the communication hole 32d formed in the lower spring bearing 32. For this reason, the distance between the upper spring bearing 31 and the lower spring bearing 32 is extended, the suspension spring 33 is extended, and the initial load of the suspension spring 33 decreases, such that the vehicle height is lowered. Accordingly, when the motorcycle 9 is stopped, foot resting performance of a rider is improved.

Accordingly, for example, in a motorcycle which is constructed such that during traveling of the motorcycle 9 in which the front fork 10 having the above-described height adjustment mechanism is mounted on the front wheel 9x side, the ECU 100 mounted in the motorcycle 9 receives a detection result from the stroke detection device 1 as input to determine a roughness (amplitude) of the road surface based on the detection result, for example, when the ECU 100 determines that amplitude of the road is large, the front fork 10 is operated such that the switching valve 131 is closed to raise the vehicle height, thereby preventing bottoming and full extension of the front fork 10. When the ECU 100 determines that amplitude of the road is small, the front fork 10 is operated such that the switching valve 131 is opened to lower the vehicle height. Therefore, for example, it is possible to reduce wind resistance by lowering the vehicle height in a case of an on-load vehicle, and to prevent shaking of the vehicle in forward and backward direction (pitching) by lowering the vehicle height in a case of an off-road vehicle.

In the above description, although a motorcycle in which the ECU 100 receives a detection result from the stroke detection device 1 as input and changes the vehicle height of the front fork 10 having a height adjustment mechanism has been described, if the stroke detection device 1 of the invention is mounted, a motorcycle in which the ECU 100 receives a detection result from the stroke detection device 1 as input and gives notification of a variation in length with respect to the reference length of the front fork obtained on the basis of the detection result to a rider with a display or a sound may be provided. Accordingly, it is possible for the rider to manually adjust the vehicle height of the front fork 10 with reference to the notification. In this case, the stroke detection device 1 of the invention can be introduced for a motorcycle in which the front fork 10 configured to manually change the initial load of the suspension spring is mounted.

A motorcycle in which the stroke detection device 1 of the invention is mounted may be a motorcycle in which a so-called inverted front fork 10 having one end of the outer tube 11 coupled to the brackets 10a and 10b and the other end of the inner tube 12 coupled to the axle 9b of the front wheel 9x of the motorcycle 9 is mounted.

What is claimed is:

1. A stroke detection device for a pair of front forks of a motorcycle which detects a variation in length with respect to a reference length of front forks, in which each of the front forks includes a tubular inner tube and a tubular outer tube, one end of the inner tube is inserted into the outer tube through an opening at the other end of the outer tube such that each of the inner tube and the outer tube is movable in a direction along a center line thereof, and one end of the outer tube is coupled to an axle of a front wheel of the motorcycle and the other end of the inner tube is coupled to a bracket, or one end of the outer tube is coupled to the bracket, and the other end of the inner tube is coupled to the axle of the front wheel of the motorcycle, the stroke detection device comprising:

a stem shaft which is formed of a conductor in a shape of a cylinder coupled to the bracket, in which a center line of the cylinder is located to be coincident with a steering center line of handlebars of the motorcycle, and the center line of the cylinder is located in parallel to the center lines of the inner tubes and the outer tubes of the front forks coupled to the bracket, and which is mounted in a vehicle frame of the motorcycle so as to be rotatable about the steering center line of the handlebars as a rotation center and serves as a steering center axis of the handlebars; and a coil which is formed of a conductor and whose center line is located to be coincident with the center line of the cylinder of the stem shaft or in parallel to the center line of the cylinder of the stem shaft so as to be movable in a direction along the center line of the cylinder of the stem shaft with movement in a direction along the center line of the inner tube and the outer tube, wherein a variation in inductance of the coil based on change in length in which the coil entering the cylinder of the stem shaft through a lower end opening of the cylinder of the stem shaft and the cylinder of the stem shaft overlap each other is output as a value for obtaining the variation in length with respect to the reference length of the front forks.

2. The stroke detection device according to claim 1, further comprising:

a shield member, wherein the coil is provided inside the shield member, and the shield member includes a conductor which is provided in a shape of a tube so as to surround an outside of an outer circumferential surface of a spiral of the coil, a gap in which a part of a tubular wall of the tube of the conductor is removed from one end to the other end of the tube, and an insulator which fills the gap.

3. The stroke detection device according to claim 2, wherein the conductor of the shield member has a cross-sectional streamline shape in which a front end portion corresponding to a front side of the motorcycle is rounded and a rear end portion corresponding to a rear side of the motorcycle is pointed.

4. The stroke detection device according to claim 2, wherein one end of the coil and one end of the shield member are placed on a base which is located above the front wheel and is mounted between the front forks so as to face the lower end opening of the cylinder of the stem shaft, the other end of the coil and the other end of the shield member are inserted into the cylinder of the stem shaft, and an elastic member which presses the other end of the coil or the other end of the shield member to bias the coil toward the base is provided inside the cylinder of the stem shaft.

5. A motorcycle comprising:

the stroke detection device for a pair of front forks in a motorcycle according to claim 4; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

6. The stroke detection device according to claim 2, wherein one end of the coil and one end of the shield member are placed on a base which is located above the front wheel and is mounted between the front forks so as to face the lower end opening of the cylinder of the stem shaft, and the other end of the coil and the other end of the shield member are inserted into the cylinder of the stem shaft so as to be movable up and down therein.

7. A motorcycle comprising:

the stroke detection device for a pair of front forks in a motorcycle according to claim 6; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

8. The stroke detection device according to claim 2, wherein one end of the coil and one end of the shield member are fixed on a base which is located above the front wheel and is mounted between the front forks so as to face the lower end opening of the cylinder of the stem shaft.

9. The stroke detection device according to claim 2, wherein one end of the shield member is fixed on a base which is located above the front wheel and is mounted between the front forks so as to face the lower end opening of the cylinder of the stem shaft, and the coil is fixed to an inner surface of the tube of the conductor of the shield member.

10. A motorcycle comprising:

the stroke detection device for a pair of front forks in a motorcycle according to claim 2; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

11. The stroke detection device according to claim 1, wherein one end of the coil is placed on a base which is located above the front wheel and is mounted between the front forks so as to face the lower end opening of the cylinder of the stem shaft, the other end of the coil is inserted into the cylinder of the stem shaft, and an elastic member which presses the other end of the coil to bias the coil toward the base is provided inside the cylinder of the stem shaft.

12. A motorcycle comprising:

the stroke detection device for a pair of front forks in a motorcycle according to claim 11; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

13. The stroke detection device according to claim 1, wherein one end of the coil is placed on a base which is located above the front wheel and is mounted between the front forks so as to face the lower end opening of the cylinder of the stem shaft, and the other end of the coil is inserted into the cylinder of the stem shaft so as to be movable up and down therein.

14. A motorcycle comprising:

the stroke detection device for a pair of front forks in a motorcycle according to claim 13; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

15. The stroke detection device according to claim 1, wherein one end of the coil is fixed on a base which is located above the front wheel and is mounted between the front forks so as to face the lower end opening of the cylinder of the stem shaft.

16. A motorcycle comprising:

the stroke detection device for a pair of front forks in a motorcycle according to claim 15; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

17. The stroke detection device according to claim 1, wherein a coil bobbin is fixed on a base which is located above the front wheel and is mounted between the front forks so as to face the lower end opening of the cylinder of the stem shaft, and the coil is wound around an outer circumference of the coil bobbin.

18. The stroke detection device according to claim 17, wherein the coil is formed of a conducting wire having a cross-sectional streamline shape in which an outer circumferential portion of a spiral of the coil is rounded and an inner circumferential portion of the spiral of the coil is pointed.

19. The stroke detection device according to claim 1, wherein the coil is formed of a conducting wire having a cross-sectional streamline shape in which an outer circumferential portion of a spiral of the coil is rounded and an inner circumferential portion of the spiral of the coil is pointed.

20. A motorcycle comprising:

the stroke detection device for a pair of front forks in a motorcycle according to claim 1; and a vehicle height adjustment device which changes a vehicle height of the motorcycle by converting a value output from the stroke detection device to the variation in length with respect to the reference length of the front forks and controlling the front forks so as to change the length of the front forks depending on the variation in length.

* * * * *